(12) United States Patent
Sano et al.

(10) Patent No.: US 8,264,595 B2
(45) Date of Patent: Sep. 11, 2012

(54) IMAGING DEVICE WITH EXTENDED DYNAMIC RANGE

(75) Inventors: Toshiyuki Sano, Kanagawa (JP); Kouichi Hoshino, Kanagawa (JP)

(73) Assignee: Panasonic Corporation, Osaka (JP)

(*) Notice: Subject to any disclaimer, the term of this patent is extended or adjusted under 35 U.S.C. 154(b) by 372 days.

(21) Appl. No.: 12/373,953

(22) PCT Filed: Jul. 31, 2007

(86) PCT No.: PCT/JP2007/064972
§ 371 (c)(1),
(2), (4) Date: Jan. 15, 2009

(87) PCT Pub. No.: WO2008/029568
PCT Pub. Date: Mar. 13, 2008

(65) Prior Publication Data
US 2009/0262215 A1    Oct. 22, 2009

(30) Foreign Application Priority Data
Sep. 6, 2006 (JP) ................ 2006-241243

(51) Int. Cl.
*H04N 5/235* (2006.01)
*G03B 7/00* (2006.01)
(52) U.S. Cl. .................... 348/362; 348/229.1
(58) Field of Classification Search .......... 348/296, 348/298, 294, 302, 308, 311, 315, 317, 362, 348/367
See application file for complete search history.

(56) References Cited

U.S. PATENT DOCUMENTS

| | | | | |
|---|---|---|---|---|
| 3,971,065 A | * | 7/1976 | Bayer | 348/276 |
| 5,990,952 A | * | 11/1999 | Hamasaki | 348/311 |
| 6,219,097 B1 | * | 4/2001 | Kamishima et al. | 348/297 |
| 6,587,149 B1 | * | 7/2003 | Yoneyama et al. | 348/362 |
| 6,771,312 B2 | * | 8/2004 | Kamishima et al. | 348/229.1 |
| 7,312,824 B2 | * | 12/2007 | Takano et al. | 348/294 |
| 7,466,358 B1 | * | 12/2008 | Kusaka et al. | 348/362 |
| 2001/0001245 A1 | * | 5/2001 | Kamishima et al. | 348/229 |
| 2009/0174792 A1 | * | 7/2009 | Kusaka et al. | 348/230.1 |

FOREIGN PATENT DOCUMENTS

| | | |
|---|---|---|
| JP | 9-116815 A | 5/1997 |
| JP | 2001-148805 A | 5/2001 |
| JP | 2004-214363 A | 7/2004 |

OTHER PUBLICATIONS

International Search Report for PCT/JP2007/064972.

* cited by examiner

*Primary Examiner* — Nicholas Giles
(74) *Attorney, Agent, or Firm* — Pearne & Gordon LLP

(57) ABSTRACT

An imaging device comprises: an imaging element (1) capable of reading accumulated charges of different exposure times in a predetermined frame period, the imaging element being divided into groups for long-time exposure and short-time exposure; and a timing pulse generator (2) for adjusting read timings of the imaging element (1). A first read timing at which an accumulated charge of long-time exposure is read from the group for long-time exposure and a second read timing at which an accumulated charge of short-time exposure is read from the group for short-time exposure are adjusted separately from each other. This provides an imaging device that can extend the dynamic range according to the degree of contrast between light and shade of a subject.

12 Claims, 17 Drawing Sheets

IMAGING DEVICE WITH EXTENDED DYNAMIC RANGE

TECHNICAL FIELD

The present invention relates to an imaging device to be used for a video camera or the like, particularly to a technique to extend the dynamic range.

BACKGROUND ART

Conventionally, there is known imaging devices that obtain image signals of different amounts of exposure from a CCD or other solid-state imaging element to extend the dynamic range. For example, Japanese Patent Laid-Open Application No. Heisei 5-64083 (pages 8 to 10 and FIG. 11) discloses such an imaging device. In the conventional imaging device, pixels (photodiodes) provided with filters and pixels (photodiodes) not provided with filters are arranged one line after the other.

This conventional imaging device is configured such that the amount of exposure varies between pixels by providing the pixels with a difference in sensitivity using filters, and image signals of different amounts of exposure can be obtained with even one exposure. Image signals of different amounts of exposure obtained in this manner are synthesized to extend the dynamic range of an image signal.

As described above, the conventional imaging device is configured such that the amount of exposure varies between pixels by providing the pixels with a difference in sensitivity using filters, in order to extend the dynamic range. For this reason, filters have to be changed in order to change the ratio of the amount of exposure between pixels provided with filters and pixels not provided with filters. That is to say, it is difficult to change the ratio of the amount of exposure of pixels in the conventional imaging device. Therefore, when a subject with a large contrast between light and shade is imaged, it is difficult to adjust the ratio of the amount of exposure of pixels according to the degree of contrast between light and shade of the subject. For example, when the imaging device is used as a surveillance camera or the like, the device is unsuitable for imaging a subject with a large contrast between light and shade.

DISCLOSURE OF THE INVENTION

Problems to be Solved by the Invention

The invention has been made in the above-mentioned background. A purpose of the invention is to provide an imaging device that can adjust an exposure time for each pixel group and can extend the dynamic range according to the degree of contrast between light and shade of the subject.

Means for Solving the Problems

One aspect of the invention is an imaging device, which comprises: an imaging unit capable of reading accumulated charge signals of different exposure times in a prescribed frame period from pixels in each of pixel groups, which are a long-time exposure pixel group and a short-time exposure pixel group, into which all pixels are divided; a first reader for reading an accumulated charge signal of long-time exposure from the long-time exposure pixel group at a first read timing after a long-time exposure period in the frame period; a second reader for reading an accumulated charge signal of short-time exposure from the short-time exposure pixel group at a second read timing after a short-time exposure period in the frame period; a read timing adjuster for adjusting the first read timing and the second read timing separately from each other; a long-time exposure signal generator for generating a long-time exposure signal, using the accumulated charge signal of long-time exposure read from the long-time exposure pixel group; a short-time exposure signal generator for generating a short-time exposure signal, using the accumulated charge signal of short-time exposure read from the short-time exposure pixel group; and a synthesizer for synthesizing the long-time exposure signal and the short-time exposure signal to generate an image signal representing all pixels.

Another aspect of the invention is an imaging method, in which an imaging unit capable of reading accumulated charge signals of different exposure times in a prescribed frame period from pixels in each of pixel groups, which are a long-time exposure pixel group and a short-time exposure pixel group, into which all pixels are divided is used, the method comprising: adjusting a first read timing after a long-time exposure period in the frame period and a second read timing after a short-time exposure period in the frame period separately from each other; reading an accumulated charge signal of long-time exposure from the long-time exposure pixel group at the first read timing; reading an accumulated charge signal of short-time exposure from the short-time exposure pixel group at the second read timing; generating a long-time exposure signal, using the accumulated charge signal of long-time exposure read from the long-time exposure pixel group; generating a short-time exposure signal, using the accumulated charge signal of short-time exposure read from the short-time exposure pixel group; and synthesizing the long-time exposure signal and the short-time exposure signal to generate an image signal representing all pixels.

Another aspect of the invention is an imaging program for imaging in which an imaging unit capable of reading accumulated charge signals of different exposure times in a prescribed frame period from pixels in each of pixel groups, which are a long-time exposure pixel group and a short-time exposure pixel group, into which all pixels are divided is used and, in which the imaging unit is capable of adjusting a first read timing after a long-time exposure period in the frame period and a second read timing after a short-time exposure period in the frame period separately from each other, and the program causes a computer to execute procedures of: reading an accumulated charge signal of long-time exposure from the long-time exposure pixel group at the first read timing; reading an accumulated charge signal of short-time exposure from the short-time exposure pixel group at the second read timing; generating a long-time exposure signal, using the accumulated charge signal of long-time exposure read from the long-time exposure pixel group; generating a short-time exposure signal, using the accumulated charge signal of short-time exposure read from the short-time exposure pixel group; and synthesizing the long-time exposure signal and the short-time exposure signal to generate an image signal representing all pixels.

There are other aspects of the invention as described below. This disclosure of the invention therefore intends to provide part of the aspects of the invention and does not intend to limit the scope of the invention described and claimed herein.

DESCRIPTION OF THE SYMBOLS

Figure 1:
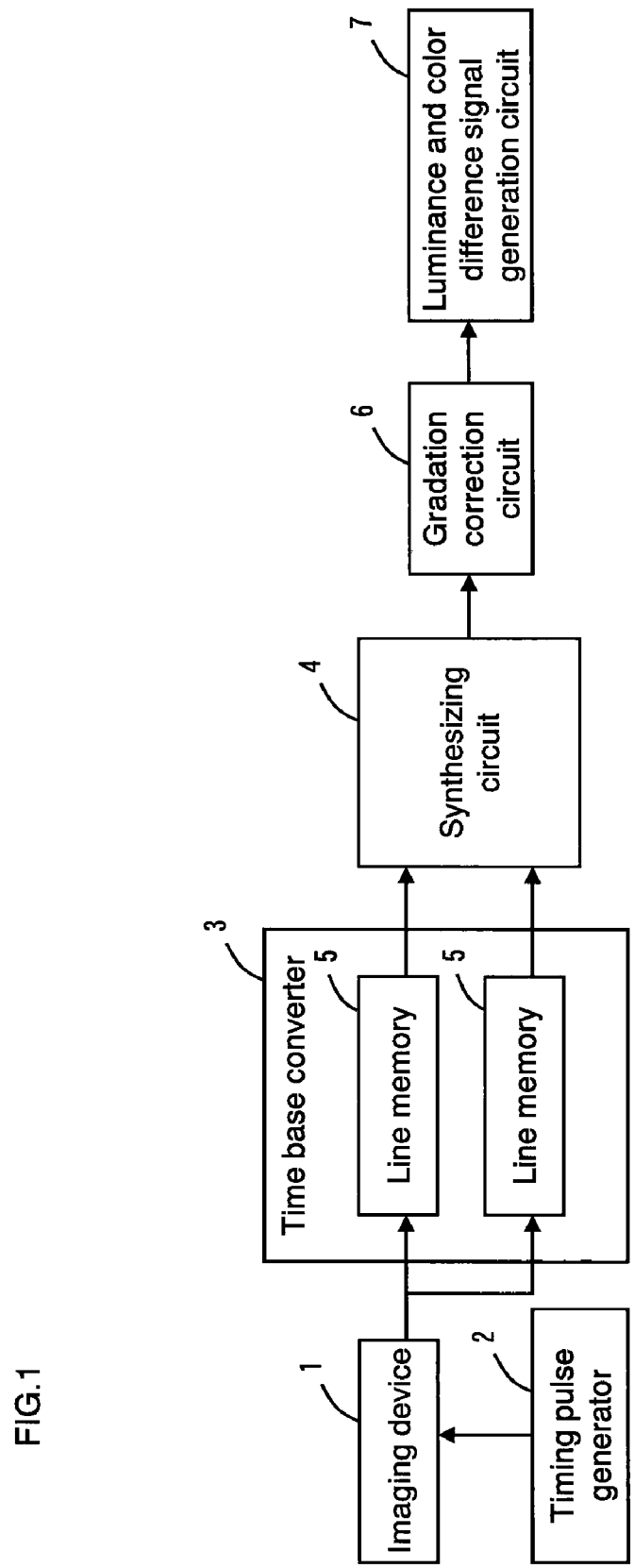
FIG. 1 is a block diagram of an imaging device of a first embodiment of the invention.

1: Imaging element
2: Timing pulse generator
4: Synthesizing circuit
8: Photodiode
10: First vertical transfer path
11: Second vertical transfer path
13: First gate electrode
14: Second gate electrode
15: Long-time exposure signal generator
16: Short-time exposure signal generator
18: Third gate electrode

BEST MODE OF EMBODYING THE INVENTION

Now, the invention will be described in detail. However, the following detailed description and appended drawings are not intended to limit the invention. Rather, the scope of the invention is defined by the appended claims.

An imaging device of the invention comprises: an imaging unit capable of reading accumulated charge signals of different exposure times in a prescribed frame period from pixels in each of pixel groups, which are a long-time exposure pixel group and a short-time exposure pixel group, into which all pixels are divided; a first reader for reading an accumulated charge signal of long-time exposure from the long-time exposure pixel group at a first read timing after a long-time exposure period in the frame period; a second reader for reading an accumulated charge signal of short-time exposure from the short-time exposure pixel group at a second read timing after a short-time exposure period in the frame period; a read timing adjuster for adjusting the first read timing and the second read timing separately from each other; a long-time exposure signal generator for generating a long-time exposure signal, using the accumulated charge signal of long-time exposure read from the long-time exposure pixel group; a short-time exposure signal generator for generating a short-time exposure signal, using the accumulated charge signal of short-time exposure read from the short-time exposure pixel group; and a synthesizer for synthesizing the long-time exposure signal and the short-time exposure signal to generate an image signal representing all pixels.

In this configuration, an exposure time for pixels in the long-time exposure pixel group (long-time exposure period) can easily be changed by changing the first read timing. An exposure time for pixels in the short-time exposure pixel group (short-time exposure period) can also easily be changed by changing the second read timing. In this way, the exposure time can be adjusted for each pixel group by separately adjusting the first read timing and the second read timing, and the dynamic range can be extended according to the degree of contrast between light and shade of a subject. For example, when a subject with a large contrast between light and shade is imaged, the dynamic range can be extended by adjusting the long-time exposure period to be longer and the short-time exposure period to be shorter.

The imaging device of the invention may have a third reader for reading an accumulated charge signal of long-time exposure from the short-time exposure pixel group at the first read timing in the frame period, where the long-time exposure signal generator may add the accumulated charge signal of long-time exposure read from the short-time exposure pixel group to the accumulated charge signal of long-time exposure read from the long-time exposure pixel group to generate the long-time exposure signal.

In this configuration, the accumulated charge signal of long-time exposure read from the short-time exposure pixel group can be used as well as the accumulated charge signal of long-time exposure read from the long-time exposure pixel group, and the sensitivity to the long-time exposure signal is improved.

The imaging device of the invention may have a fourth reader for reading an accumulated charge signal of short-time exposure from the long-time exposure pixel group at a second read timing in the frame period, where the long-time exposure signal generator adds the accumulated charge signal of short-time exposure read from the long-time exposure pixel group to the accumulated charge signal of long-time exposure read from the long-time exposure pixel group to generate the long-time exposure signal.

In this configuration, the accumulated charge signal of short-time exposure read from the long-time exposure pixel group can be used as well as the accumulated charge signal of long-time exposure read from the long-time exposure pixel group, and the sensitivity to the long-time exposure signal is further improved.

In the imaging device of the invention, pixels in the long-time exposure pixel group and pixels in the short-time exposure pixel group may be alternately arranged in a longitudinal or transverse direction.

In this configuration, pixels in the long-time exposure pixel group and pixels in the short-time exposure group are evenly arranged in a longitudinal or transverse direction. Consequently, in the case where all the pixels are divided into the two groups (the long-time exposure pixel group and the short-time exposure group), unevenness in resolution can be prevented from occurring in each pixel group.

In the imaging device of the invention, the pixels may be arranged so that a pixel array thereof is a Bayer array in each of the long-time exposure pixel group and the short-time exposure pixel group.

In this configuration, accumulated charge signals read from the long-time exposure pixel group and the short-time exposure pixel group will be Bayer array signals, so that long-time and short-time exposure signals generated from these accumulated charge signals can easily be image-processed with a common signal processing technique (signal processing intended for a primary color Bayer array).

In the imaging device of the invention, the first reader may comprise: a first transfer path that connects with each pixel in the long-time exposure pixel group; and a first gate electrode to be a read path from each pixel in the long-time exposure pixel group to the first transfer path, the second reader may comprise: a second transfer path that connects with each pixel in the short-time exposure pixel group; and a second gate electrode to be a read path from each pixel in the short-time exposure pixel group to the second transfer path, and the read timing adjuster may apply a gate voltage to the first gate electrode at the first read timing and may apply a gate voltage to the second gate electrode at the second read timing.

In this configuration, when a gate voltage is applied to the first gate electrode at the first read timing, an accumulated charge signal of long-time exposure is read from each pixel in the long-time exposure pixel group to the first transfer path. When a gate voltage is applied to the second gate electrode at the second read timing, an accumulated charge signal of short-time exposure is read from each pixel in the short-time exposure pixel group to the second transfer path. The exposure time can thus be adjusted for each pixel group.

In the imaging device of the invention, the third reader may comprise: the first transfer path that connects with each pixel in the short-time exposure pixel group; and a third gate electrode to be a read path from each pixel in the short-time exposure pixel group to the first transfer path, and the read timing adjuster may apply a gate voltage to the third gate electrode at the first read timing.

In this configuration, when a gate voltage is applied to the third gate electrode at the first read timing, an accumulated charge signal of long-time exposure is read from each pixel in the short-time exposure pixel group to the first transfer path. This allows an accumulated charge signal of long-time exposure read from the short-time exposure pixel group to be used.

In the imaging device of the invention, the fourth reader may comprise: the first transfer path that connects with each pixel in the long-time exposure pixel group; and the first gate electrode to be a read path from each pixel in the long-time exposure pixel group to the first transfer path, and the read timing adjuster may apply a gate voltage to the first gate electrode at the second read timing.

In this configuration, when a gate voltage is applied to the first gate electrode at the second read timing, an accumulated charge signal of short-time exposure is read from each pixel in the long-time exposure pixel group to the first transfer path. This allows an accumulated charge signal of short-time exposure read from the long-time exposure pixel group to be used.

A method of the invention is an imaging method in which an imaging unit capable of reading accumulated charge signals of different exposure times in a prescribed frame period from pixels in each of pixel groups, which are a long-time exposure pixel group and a short-time exposure pixel group, into which all pixels are divided is used; the method comprising: adjusting a first read timing after a long-time exposure period in the frame period and a second read timing after a short-time exposure period in the frame period separately from each other; reading an accumulated charge signal of long-time exposure from the long-time exposure pixel group at the first read timing; reading an accumulated charge signal of short-time exposure from the short-time exposure pixel group at the second read timing; generating a long-time exposure signal, using the accumulated charge signal of long-time exposure read from the long-time exposure pixel group; generating a short-time exposure signal, using the accumulated charge signal of short-time exposure read from the short-time exposure pixel group; and synthesizing the long-time exposure signal and the short-time exposure signal to generate an image signal representing all pixels.

Also with this method, an exposure time for pixels in the long-time exposure pixel group (long-time exposure period) can easily be changed by changing the first read timing, as described above. An exposure time for pixels in the short-time exposure pixel group (short-time exposure period) can also easily be changed by changing the second read timing. In this way, the exposure time can be adjusted for each pixel group by separately adjusting the first read timing and the second read timing, and the dynamic range can be extended according to the degree of contrast between light and shade of a subject. For example, when a subject with a large contrast between light and shade is imaged, the dynamic range can be extended by adjusting the long-time exposure period to be longer and the short-time exposure period to be shorter.

A program of the invention is an imaging program for imaging in which an imaging unit capable of reading accumulated charge signals of different exposure times in a prescribed frame period from pixels in each of pixel groups, which are a long-time exposure pixel group and a short-time exposure pixel group, into which all pixels are divided is used and, in which the imaging unit is capable of adjusting a first read timing after a long-time exposure period in the frame period and a second read timing after a short-time exposure period in the frame period separately from each other, and the program causes a computer to execute procedures of: reading an accumulated charge signal of long-time exposure from the long-time exposure pixel group at the first read timing; reading an accumulated charge signal of short-time exposure from the short-time exposure pixel group at the second read timing; generating a long-time exposure signal, using the accumulated charge signal of long-time exposure read from the long-time exposure pixel group; generating a short-time exposure signal, using the accumulated charge signal of short-time exposure read from the short-time exposure pixel group; and synthesizing the long-time exposure signal and the short-time exposure signal to generate an image signal representing all pixels.

Also with this program, an exposure time for pixels in the long-time exposure pixel group (long-time exposure period) can easily be changed by changing the first read timing, as described above. An exposure time for pixels in the short-time exposure pixel group (short-time exposure period) can also easily be changed by changing the second read timing. In this way, the exposure time can be adjusted for each pixel group by separately adjusting the first read timing and the second read timing, and the dynamic range can be extended according to the degree of contrast between light and shade of a subject. For example, when a subject with a large contrast between light and shade is imaged, the dynamic range can be extended by adjusting the long-time exposure period to be longer and the short-time exposure period to be shorter.

In the invention, all pixels are divided into the two pixel groups and there are provided: the imaging unit capable of reading accumulated charge signals of different exposure times from pixels in each pixel group; and the read timing adjuster for adjusting the first read timing at which an accumulated charge signal of long-time exposure is read from the long-time exposure pixel group and the second read timing at which an accumulated charge signal of short-time exposure is read from the short-time exposure pixel group separately from each other, so that the exposure time can be adjusted for each pixel group and the dynamic range can be extended according to the degree of contrast between light and shade of a subject.

Now, an imaging device and an imaging method of an embodiment of the invention will be described with reference to the drawings. The embodiment illustrates an imaging device to be used as a surveillance camera or the like. This imaging device is provided with a dynamic range extending function, which is carried out by a program stored in a memory of the imaging device or the like.

First Embodiment

Figure 2:
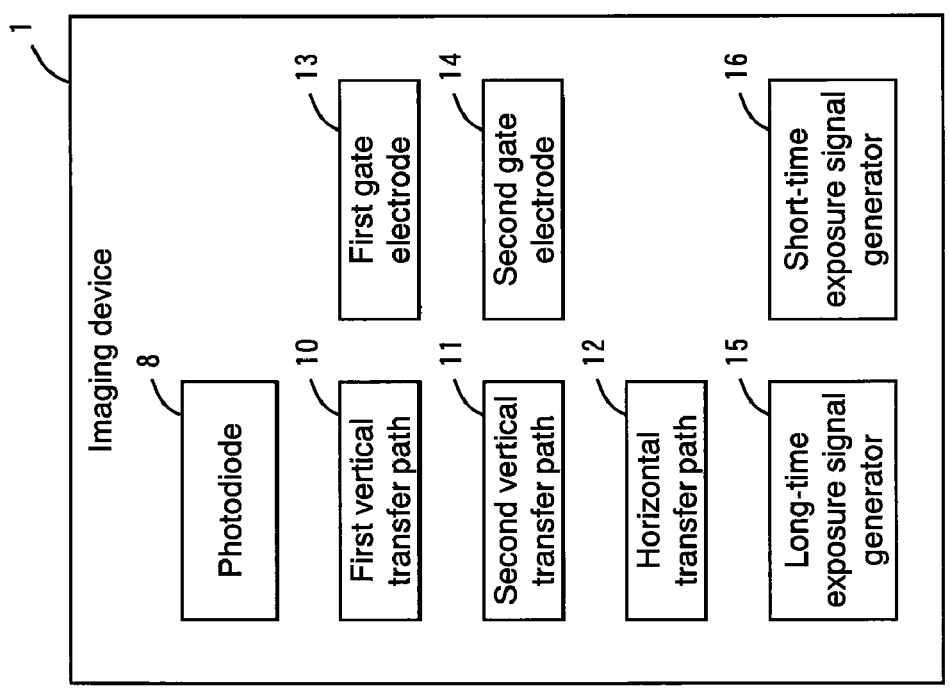
FIG. 2 is a block diagram of an imaging element of the imaging device of the first embodiment of the invention.
Figure 3:
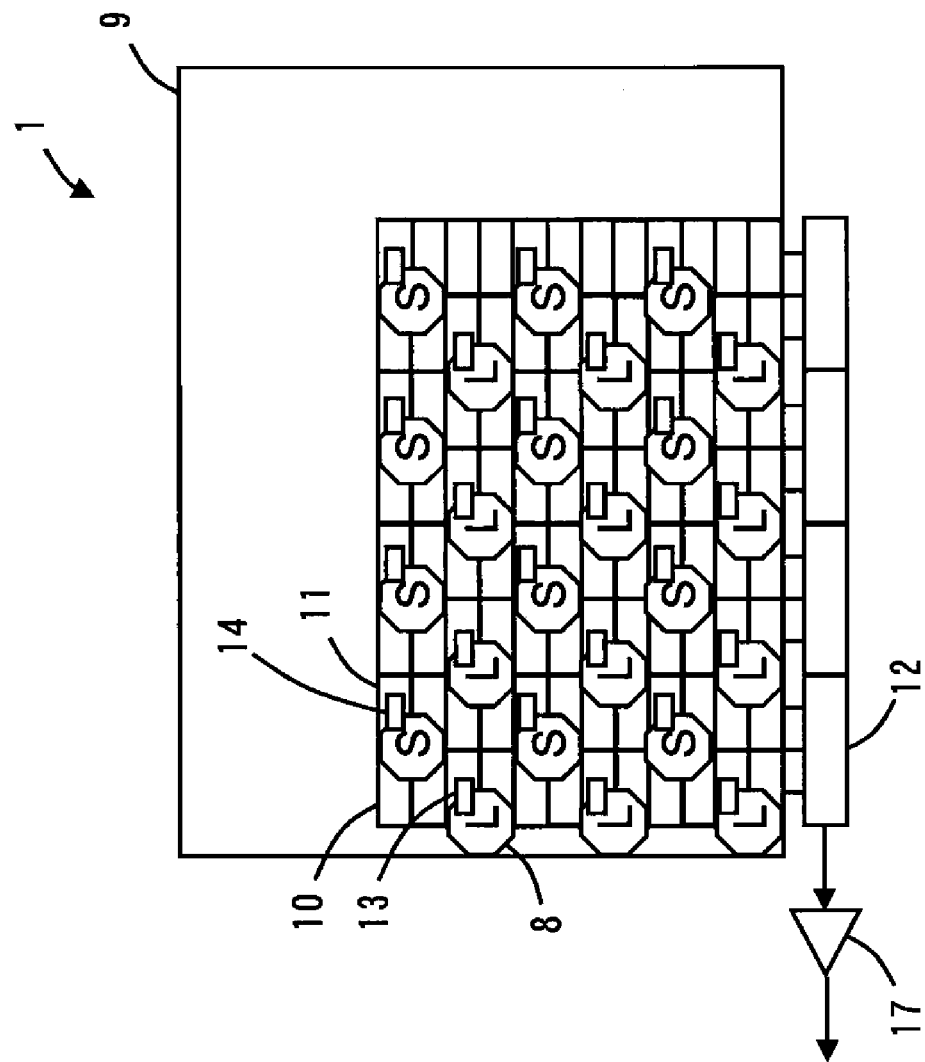
FIG. 3 is an illustration of the imaging element of the imaging device of the first embodiment of the invention.
Figure 4:
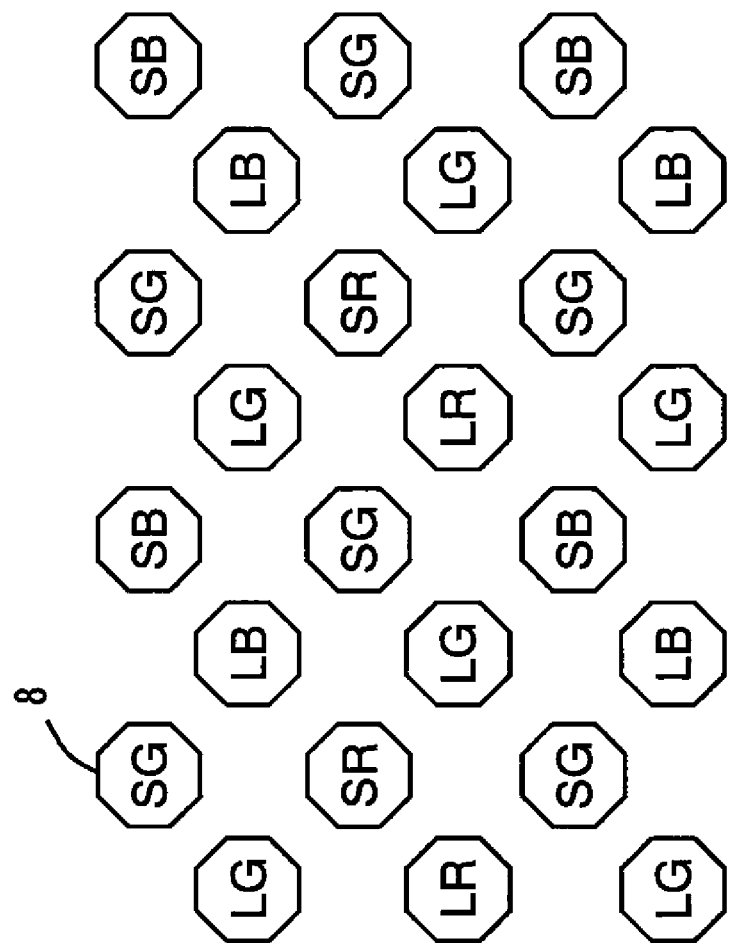
FIG. 4 is an illustration of a pixel arrangement of the imaging element of the imaging device of the first embodiment of the invention.

An imaging device of a first embodiment of the invention is shown in FIGS. 1 to 7. FIG. 1 is a block diagram showing a configuration of the imaging device of the embodiment. FIG. 2 is a block diagram showing a configuration of an imaging element 1 of the embodiment. FIG. 3 is an illustration showing a main configuration of the imaging element 1. FIG. 4 is an illustration showing a pixel arrangement of the imaging element 1.

First, a configuration of the imaging device will be described with reference to FIG. 1. As shown in FIG. 1, the imaging device has the imaging element 1, such as a CCD and a CMOS, and a timing pulse generator 2 for controlling read timing of the imaging element 1. In this embodiment, the imaging element 1 corresponds to the imaging unit of the invention, and the timing pulse generator 2 corresponds to the read timing adjuster of the invention.

The imaging device has a time base converter 3 for performing a below-described synchronization process on two output signals from the imaging element 1 (long-time and short-time exposure signals), and a synthesizing circuit 4 for synthesizing output signals from the time base converter 3 (synchronized long-time and short-time exposure signals) to generate an image signal representing all pixels. The time base converter 3 comprises two line memories 5 for separately writing and reading long-time and short-time exposure signals. In this embodiment, the synthesizing circuit 4 corresponds to the synthesizer of the invention.

The imaging device also has a gradation correction circuit 6 for performing a gradation correction process that enhances the contrast of an image signal, and a luminance and color difference signal generation circuit 7 for separating an image signal into a luminance signal and a color difference signal and outputting them as a video output signal.

A configuration of the imaging element 1 will next be described with reference to FIGS. 2 to 4. As shown in FIGS. 2 and 3, the imaging element 1 has a plurality of photodiodes 8 as light receiving elements. The total number of these photodiodes 8 determines the number of pixels of the imaging element 1. As shown in FIG. 3, these photodiodes 8 are arranged in a planer manner on a substrate 9 of the imaging element 1 and are divided into two groups which are photodiodes 8 for use in long-time exposure and photodiodes 8 for use in short-time exposure. In FIG. 3, a photodiode 8 for use in long-time exposure is denoted by "L," and a photodiode 8 for use in short-time exposure is denoted by "S."

Pixels mean light receiving elements comprising the imaging element 1 (CCD or the like) and, in this embodiment, a photodiode 8 corresponds to a pixel of the invention. A pixel group is a group of pixels and, in this embodiment, the group of photodiodes 8 for use in long-time exposure corresponds to the long-time exposure pixel group of the invention, and the group of photodiodes 8 for use in short-time exposure corresponds to the short-time exposure pixel group of the invention.

As shown in FIG. 3, photodiodes 8 for use in long-time exposure and photodiodes 8 for use in short-time exposure are alternately arranged in longitudinal and transverse directions. That is, odd-numbered lines starting from the bottom (first line, third line . . . ) are lines for photodiodes 8 for use in long-time exposure, and even-numbered lines starting from the bottom (second line, fourth line . . . ) are lines for photodiodes 8 for use in short-time exposure. Furthermore, odd-numbered rows starting from the left (first row, third row . . . ) are rows for photodiodes 8 for use in long-time exposure, and even-numbered rows starting from the left (second row, fourth row . . . ) are rows for photodiodes 8 for use in short-time exposure.

In the imaging element 1 shown in FIG. 3, each photodiode 8 is arranged so that photodiodes 8 for use in long-time exposure in odd-numbered lines starting from the bottom and photodiodes 8 for use in short-time exposure in even-numbered lines starting from the bottom are shifted from each other. Furthermore, each photodiode 8 is arranged so that photodiodes 8 for use in long-time exposure in odd-numbered rows starting from the left and photodiodes 8 for use in short-time exposure in even-numbered rows starting from the left are shifted from each other.

In the imaging element 1 of the embodiment, as shown in FIG. 4, each photodiode 8 is arranged so that the pixel array is a Bayer array in each group of photodiodes 8 for use in long-time exposure and photodiodes 8 for use in short-time exposure.

That is, regarding the group of photodiodes 8 for use in long-time exposure in odd-numbered lines starting from the bottom, photodiodes 8 for the G component and photodiodes 8 for the B component are alternately arranged in the first line from the bottom, which is a line for photodiodes 8 for use in long-time exposure, and photodiodes 8 for the R component and photodiodes 8 for the G component are alternately arranged in the third line from the bottom, which is a line for photodiodes 8 for use in long-time exposure. In FIG. 4, a photodiode 8 for the G component for long-time use is denoted by "LG," and a photodiode 8 for the B component for long-time use is denoted by "LB." A photodiode 8 for the R component for long-time use is denoted by "LR."

Similarly, regarding the group of photodiodes 8 for use in short-time exposure in even-numbered lines starting from the bottom, photodiodes 8 for the G component and photodiodes 8 for the B component are alternately arranged in the second line from the bottom, which is a line for photodiodes 8 for use in short-time exposure, and photodiodes 8 for the R component and photodiodes 8 for the G component are alternately arranged in the fourth line from the bottom, which is a line for photodiodes 8 for use in short-time exposure. In FIG. 4, a photodiode 8 for the G component for short-time use is denoted by "SG," and a photodiode 8 for the B component for short-time use is denoted by "SB." A photodiode 8 for the R component for short-time use is denoted by "SR."

In this description, photodiodes 8 for the R component (or G or B component) mean photodiodes 8 highly sensitive to R component (or G or B component) wavelength region. In this case, photodiodes 8 having different sensitivity to the R, G, and B components may be used as photodiodes 8 for the R, G, and B components, respectively. Photodiodes 8 having the same sensitivity characteristic may be separately provided with color filters having high transmissivity in the R, G, and B component wavelength regions so as to be used as photodiodes 8 for the R, G, and B components.

As shown in FIGS. 2 and 3, the imaging element 1 has: two vertical transfer paths (a first vertical transfer path 10 and a second vertical transfer path 11) for transferring a charge accumulated in photodiodes 8 (accumulated charge) in the vertical direction (longitudinal direction; downward in FIG. 3); and a horizontal transfer path 12 for transferring the charge transferred from the vertical transfer paths in the horizontal direction (transverse direction; leftward in FIG. 3). In this embodiment, the accumulated charge corresponds to the accumulated charge signal of the invention. The first vertical transfer path 10 corresponds to the first transfer path of the invention, and the second vertical transfer path 11 corresponds to the second transfer path of the invention.

The imaging element 1 has a first gate electrode 13 to be a read path from photodiodes 8 for use in long-time exposure to the first vertical transfer path 10, and a second gate electrode 14 to be a read path from photodiodes 8 for use in short-time exposure to the second vertical transfer path 11. The first gate electrode 13 is controlled to read an accumulated charge from photodiodes 8 for use in long-time exposure to the first vertical transfer path 10 when a gate voltage is applied from the timing pulse generator 2. The second gate electrode 14 is controlled to read an accumulated charge from photodiodes 8 for use in short-time exposure to the second vertical transfer path 11 when a gate voltage is applied from the timing pulse generator 2. In the embodiment, a first read timing at which a gate voltage is applied to the first gate electrode 13 and a second read timing at which a gate voltage is applied to the second gate electrode 14 can be adjusted separately from each other. In this embodiment, the first gate electrode 13 corresponds to the first gate electrode of the invention, and the second gate electrode 14 corresponds to the second gate electrode of the invention. The first gate electrode 13 and the first vertical transfer path 10 correspond to the first reader of the invention, and the second gate electrode 14 and the second vertical transfer path 11 correspond to the second reader of the invention.

In the example shown in FIG. 3, the first vertical transfer path 10 is provided at a position corresponding to photodiodes 8 for use in long-time exposure in odd-numbered rows starting from the left, and the second vertical transfer path 11 is provided at a position corresponding to photodiodes 8 for use in short-time exposure in even-numbered rows starting from the left. The first gate electrode 13 connects photodiodes 8 for use in long-time exposure and the first vertical transfer path 10, and the second gate electrode 14 connects photodiodes 8 for use in short-time exposure and the second vertical transfer path 11.

The timing at which the timing pulse generator 2 applies a gate voltage to the first gate electrode 13 (first read timing) and the timing at which the timing pulse generator 2 applies a gate voltage to the second gate electrode 14 (second read timing) are controlled separately from each other. As above, the imaging element 1 is configured such that it can read accumulated charges of different exposure times (an accumulated charge in photodiodes 8 for use in long-time exposure and an accumulated charge in photodiodes 8 for use in short-time exposure) separately from each other in one frame period.

As shown in FIGS. 2 and 3, the imaging element 1 has: a long-time exposure signal generator 15 for generating a long-time exposure signal according to the amount of charge of an accumulated charge read to the first vertical transfer path 10; and a short-time exposure signal generator 16 for generating a short-time exposure signal according to the amount of charge of an accumulated charge read to the second vertical transfer path 11. In this embodiment, the long-time exposure signal generator 15 corresponds to the long-time exposure signal generator of the invention, and the short-time exposure signal generator 16 corresponds to the short-time exposure signal generator of the invention.

Figure 5:
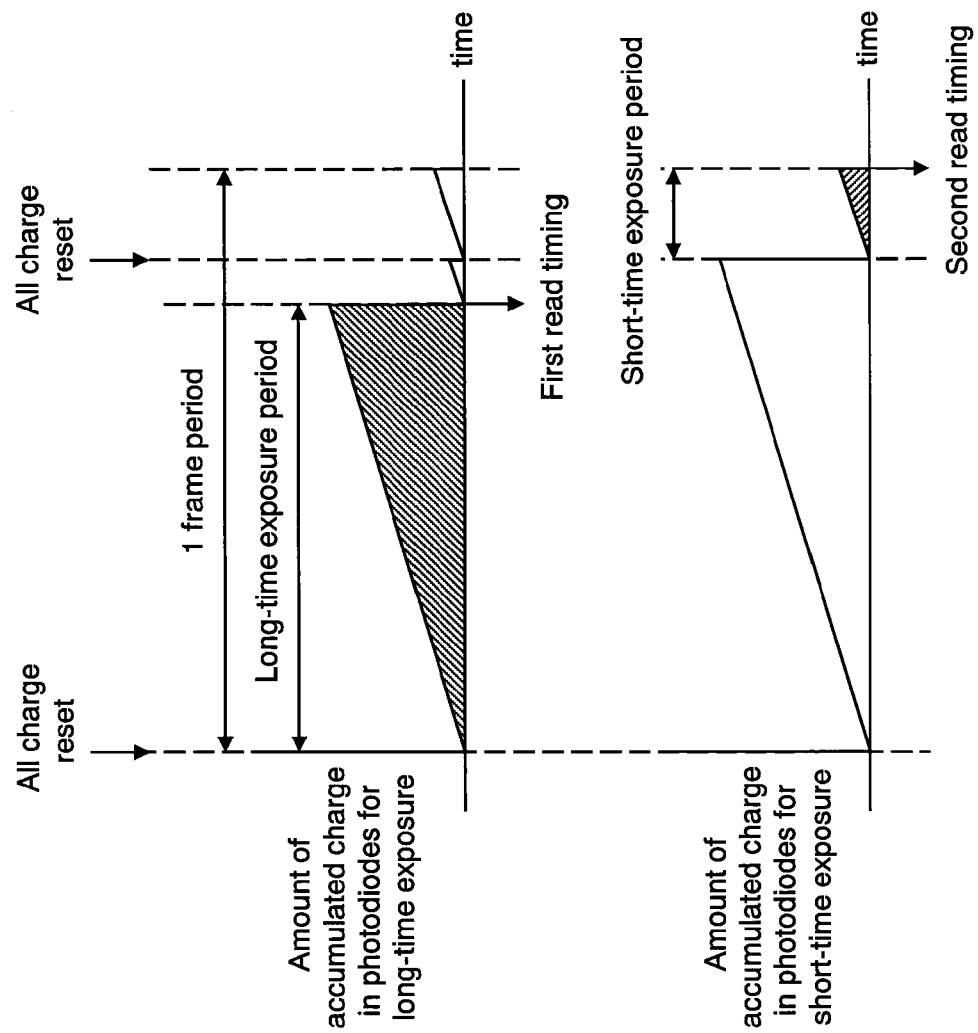
FIG. 5 is an illustration of operation timings of the imaging device of the first embodiment of the invention.

An operation of the imaging device configured as above will be described with reference to FIGS. 5 to 7.

When the imaging device of the first embodiment of the invention images a subject, photodiodes 8 of the imaging element 1 receive incident light and a charge is accumulated by the photoelectric effect. FIG. 5 shows how the amount of accumulated charge in photodiodes 8 changes according to time. As shown in FIG. 5, in the imaging element 1 of the embodiment, the timing pulse generator 2 applies a substrate voltage at the starting point of time of one frame period, and residual charges in all the photodiodes 8 (all the pixels) are reset. Charge is accumulated in photodiodes 8 during a prescribed long-time exposure period. Therefore, the starting point of time of one frame period (the point of time at the start of one frame period when all charges are reset) may also be called the starting point of time of the long-time exposure period.

The timing pulse generator 2 applies a gate voltage to the first gate electrode 13 at the first read timing after the long-time exposure period, and the accumulated charge in photodiodes 8 for use in long-time exposure is read. This first read timing may also be called the end point of time of the long-time exposure period. In the embodiment, the accumulated charge in photodiodes 8 for use in short-time exposure is not read at the first read timing.

The timing pulse generator 2 then applies the substrate voltage again in the one frame period, and residual charges in all the photodiodes 8 (all the pixels) are reset. Charge is accumulated in photodiodes 8 during a prescribed short-time exposure period. Therefore, the point of time of resetting all charges in the one frame period may also be called the starting point of time of the short-time exposure period.

The timing pulse generator 2 applies a gate voltage to the second gate electrode 14 at the second read timing after the short-time exposure period, and the accumulated charge in photodiodes 8 for use in short-time exposure is read. This second read timing may also be called the end point of time of the one frame period and the end point of time of the short-time exposure period. In the embodiment, the accumulated charge in photodiodes 8 for use in long-time exposure is not read at the second read timing.

Figure 6:
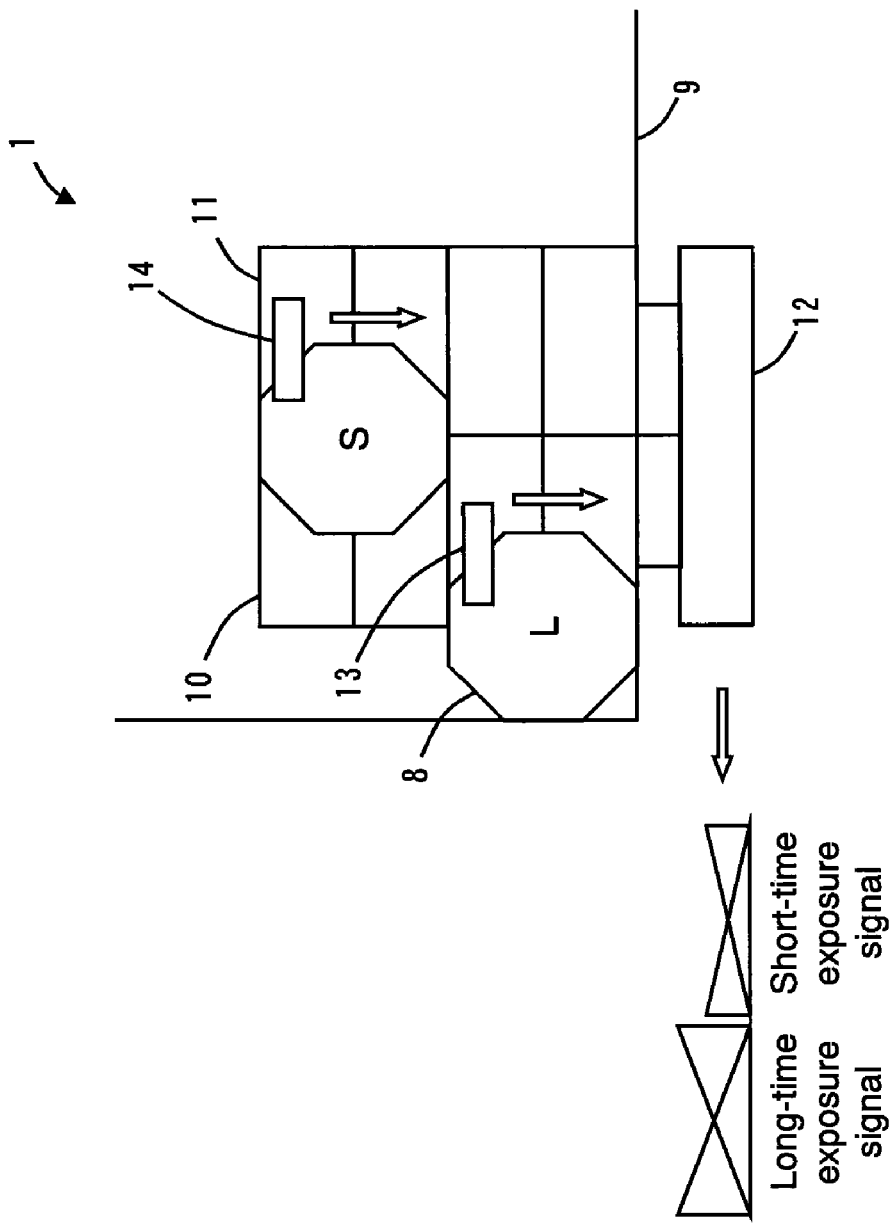
FIG. 6 is an illustration of an operation of the imaging element of the imaging device of the first embodiment of the invention.

FIG. 6 shows how accumulated charges are read from photodiodes 8 and the imaging element 1 outputs long-time and short-time exposure signals. The accumulated charge read from photodiodes 8 for use in long-time exposure at the first read timing as described above is read through the first gate electrode 13 to the first vertical transfer path 10 and is held on the first vertical transfer path 10. The accumulated charge read from photodiodes 8 for use in short-time exposure at the second read timing is read through the second gate electrode 14 to the second vertical transfer path 11 and is held on the second vertical transfer path 11.

The accumulated charges separately held on the first and second vertical transfer paths 10 and 11 are transferred one by one in the vertical direction (downward in FIG. 6) and are read to the horizontal transfer path 12. The accumulated charges read to the horizontal transfer path 12 are transferred one by one in the horizontal direction (leftward in FIG. 6) and are outputted as long-time and short-time exposure signals.

In this way, the long-time exposure signal generator 15 generates a long-time exposure signal, using an accumulated charge in photodiodes 8 for use in long-time exposure, and the short-time exposure signal generator 16 generates a short-time exposure signal, using an accumulated charge in photodiodes 8 for use in short-time exposure. The generated long-time and short-time exposure signals are outputted as an output signal from the imaging element 1 and are amplified by an amplifier 17. In this case, the output signal from the imaging element 1 is outputted line by line in order of the long-time exposure signal and the short-time exposure signal.

Figure 7:
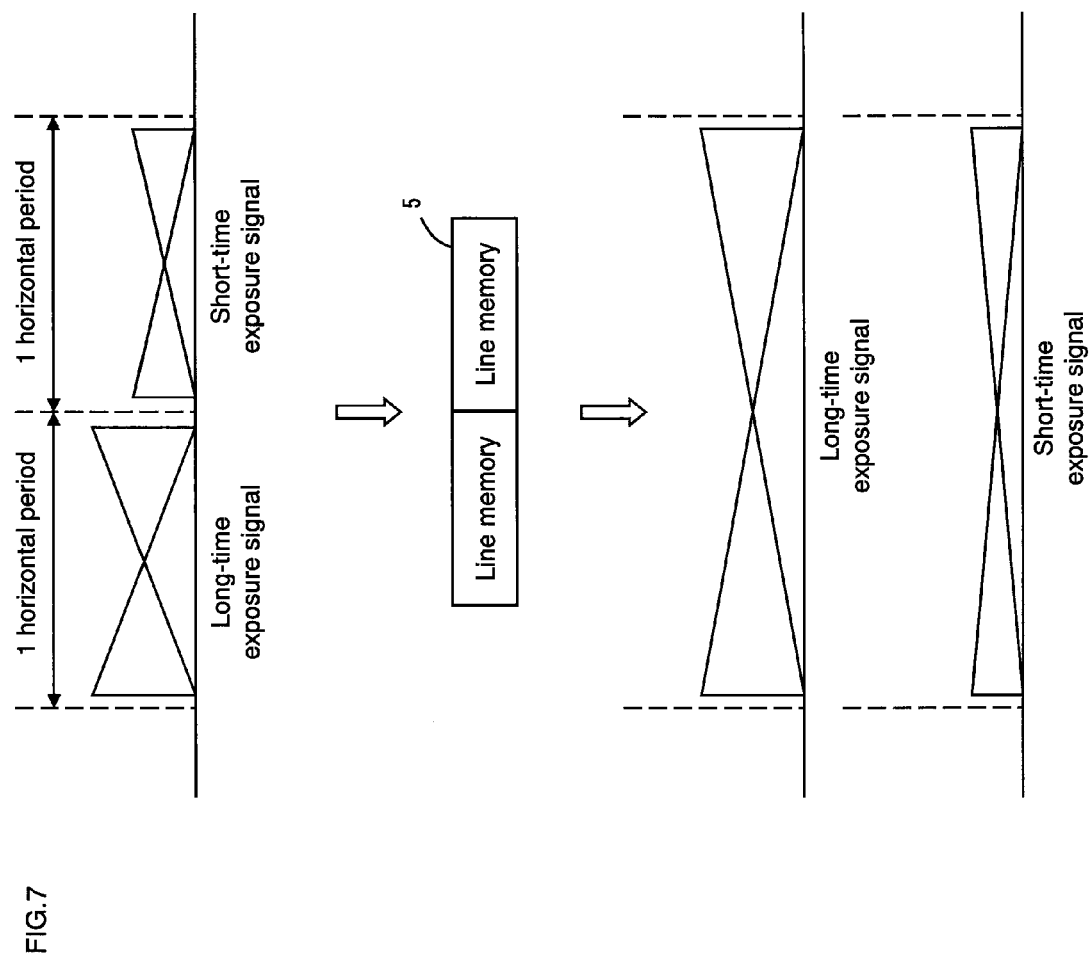
FIG. 7 is an illustration of an operation of a time base converter of the imaging device of the first embodiment of the invention.

FIG. 7 is an illustration showing how the time base converter 3 performs a synchronization process on long-time and short-time exposure signals read from the imaging element 1. The time base converter 3 performs a synchronization process in which the time base of long-time and short-time exposure signals is doubled (the rate is halved) and the long-time and short-time exposure signals are made to be in phase with each other.

Specifically, long-time and short-time exposure signals read line by line from the imaging element 1 are separately written into line memories 5 of the time base converter 3. At this time, the long-time and short-time exposure signals are written at a clock rate of when they were read. The long-time and short-time exposure signals separately written in each line memory 5 are read at half of the clock rate. At this time, the long-time and short-time exposure signals are read at timings at which both signals are in phase with each other.

The synthesizing circuit 4 synthesizes the synchronized long-time and short-time exposure signals to generate an image signal representing all pixels. The gradation correction circuit 6 then performs a gradation correction process that enhances the contrast of the image signal, and the luminance and color difference signal generation circuit 7 separates the image signal into a luminance signal and a color difference signal and outputs them as a video output signal.

In such an imaging device of the first embodiment of the invention, all the photodiodes 8 are divided into the two groups (the group for long-time exposure and the group for the short-time exposure), and there are provided: the imaging element 1 capable of reading accumulated charges of different exposure times from photodiodes 8 in each group; and the timing pulse generator 2 for adjusting the first read timing at which an accumulated charge of long-time exposure is read from photodiodes 8 for use in long-time exposure and the second read timing at which an accumulated charge of short-time exposure is read from photodiodes 8 for use in short-time exposure separately from each other, so that the exposure time can be adjusted for each group of photodiodes 8 and the dynamic range can be extended according to the degree of contrast between light and shade of a subject.

That is, in the embodiment, the exposure time for photodiodes 8 for use in long-time exposure (the long-time exposure period) can easily be changed by changing the first read timing. The exposure time for photodiodes 8 for use in short-time exposure (the short-time exposure period) can also easily be changed by changing the second read timing. In this way, the exposure time can be adjusted for each group of photodiodes 8 by separately adjusting the first read timing and the second read timing, and the dynamic range can be extended according to the degree of contrast between light and shade of a subject. For example, when a subject with a large contrast between light and shade is imaged, the dynamic range can be extended by adjusting the long-time exposure period to be longer and the short-time exposure period to be shorter.

In the embodiment, when a gate voltage is applied to the first gate electrode 13 at the first read timing, an accumulated charge of long-time exposure is read from photodiodes 8 for use in long-time exposure to the first vertical transfer path 10. Likewise, when a gate voltage is applied to the second gate electrode 14 at the second read timing, an accumulated charge of short-time exposure is read from photodiodes 8 for use in short-time exposure to the second vertical transfer path 11. In this way, the exposure time can be adjusted for each group of photodiodes 8.

In the embodiment, photodiodes 8 for use in long-time exposure and photodiodes 8 for use in short-time exposure are evenly arranged in a longitudinal or transverse direction. Consequently, in the case where all the photodiodes 8 are divided into the two groups (the group for long-time exposure and the group for short-time exposure), unevenness in resolution can be prevented from occurring in each group.

In the embodiment, accumulated charges read from the photodiodes 8 for use in long-time exposure and the photodiodes 8 for use in short-time exposure will be Bayer arrays, so that long-time and short-time exposure signals generated from these accumulated charges can easily be image-processed with a common signal processing technique (signal processing intended for a primary color Bayer array).

Second Embodiment

An imaging device of a second embodiment of the invention will next be described with reference to FIGS. 8 to 11. The imaging device of the invention is different from the first embodiment in that the imaging element 1 has a third gate electrode 18. The configuration and operation of the imaging device of the embodiment are the same as the first embodiment unless otherwise mentioned herein.

Figure 8:
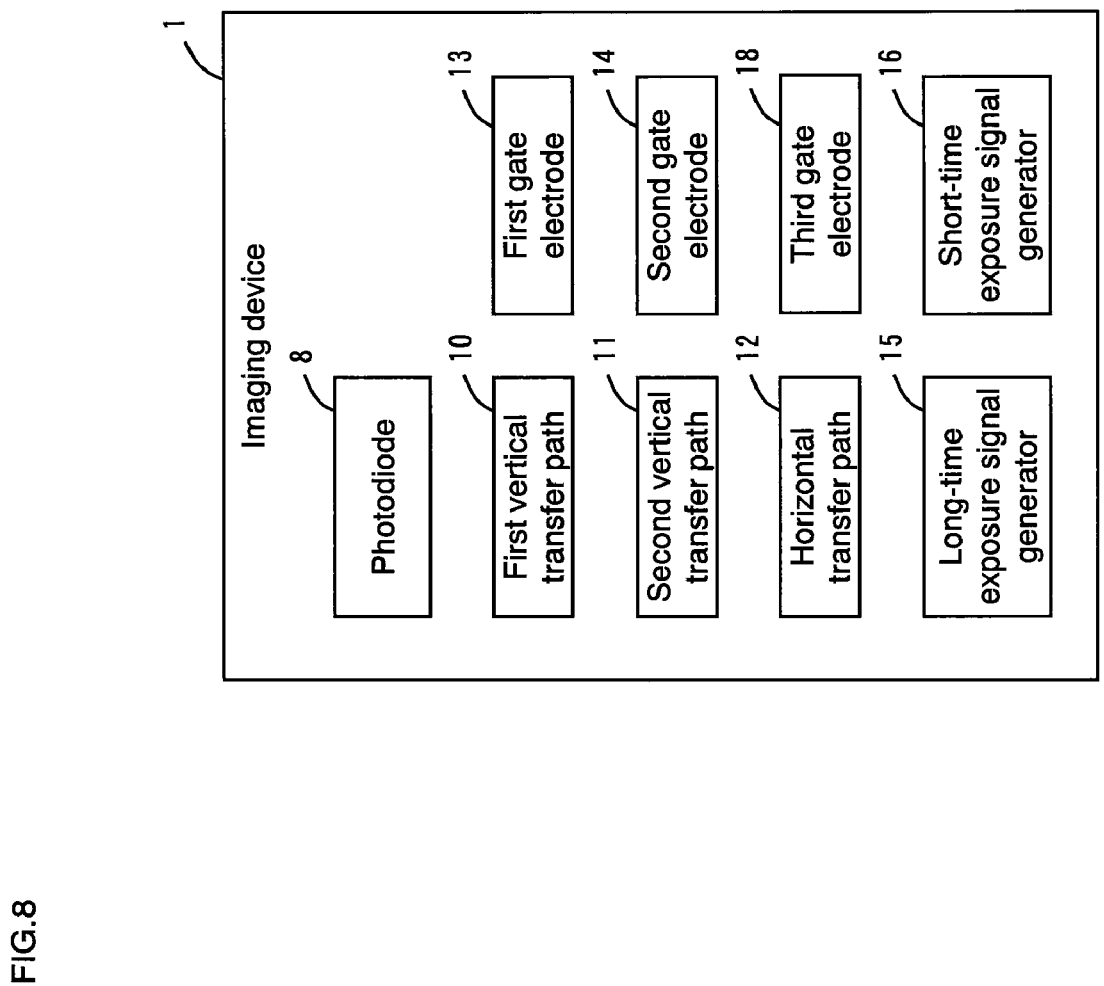
FIG. 8 is a block diagram of an imaging element of an imaging device of a second embodiment of the invention.
Figure 9:
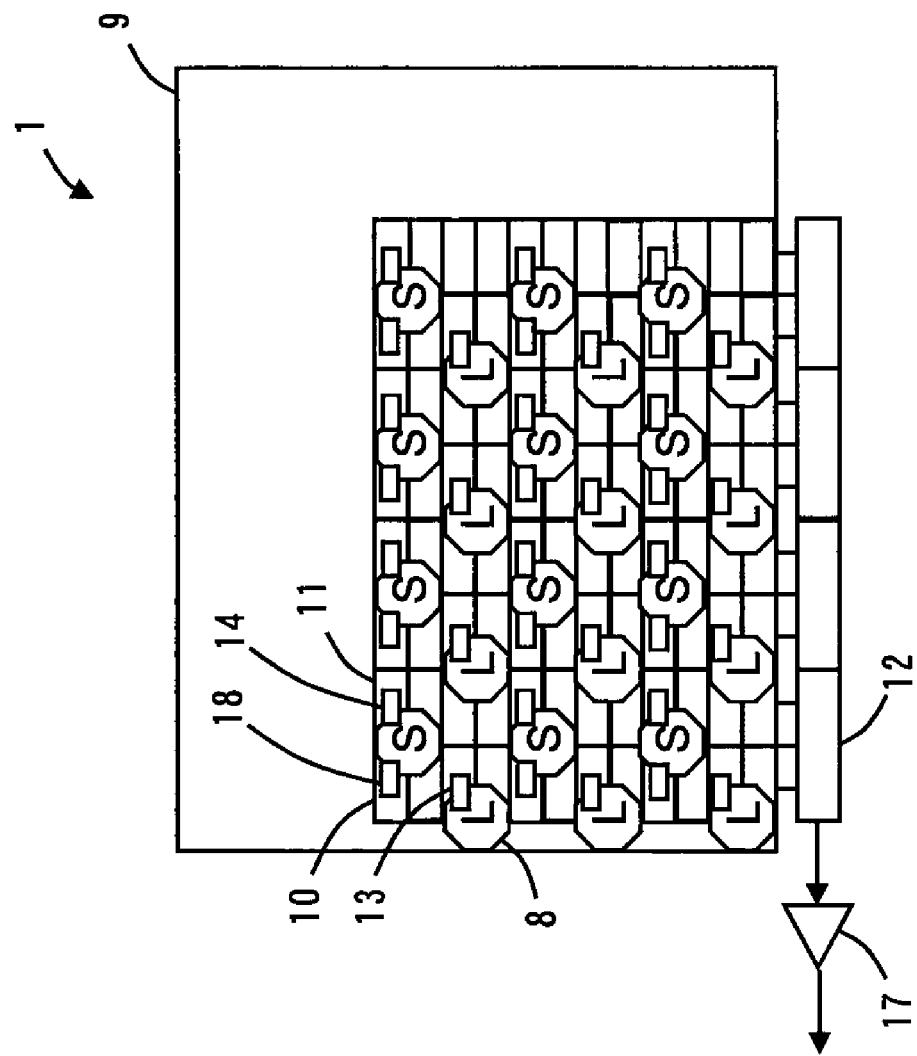
FIG. 9 is an illustration of the imaging element of the imaging device of the second embodiment of the invention.

FIG. 8 is a block diagram showing a configuration of the imaging element 1 of the embodiment, and FIG. 9 is an illustration showing a main configuration of the imaging element 1. As shown in FIGS. 8 and 9, the imaging element 1 has a third gate electrode 18 to be a read path from photodiodes 8 for use in short-time exposure to the first vertical transfer path 10. In the example shown in FIG. 9, the third gate electrode 18 connects photodiodes 8 for use in short-time exposure and the first vertical transfer path 10. The third gate electrode 18 is controlled to read an accumulated charge from photodiodes 8 for use in short-time exposure to the first vertical transfer path 10 when a gate voltage is applied from the timing pulse generator 2. In this embodiment, the third gate electrode 18 corresponds to the third gate electrode of the invention. The third gate electrode 18 and the first vertical transfer path 10 correspond to the third reader of the invention.

An operation of the imaging device configured as above will be described with reference to FIGS. 10 and 11.

Figure 10:
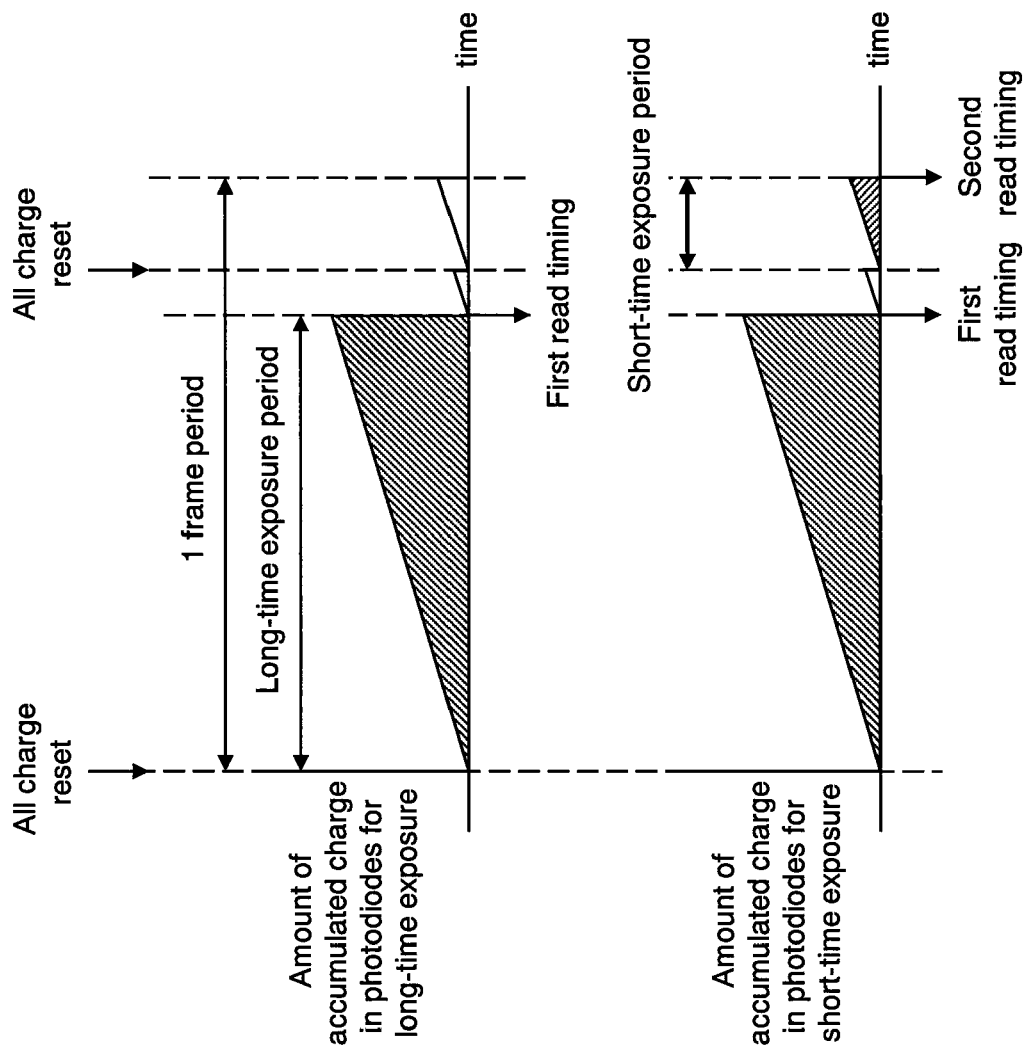
FIG. 10 is an illustration of operation timings of the imaging device of the second embodiment of the invention.

FIG. 10 shows how the amount of accumulated charge in photodiodes 8 changes according to time. As shown in FIG. 10, in the imaging element 1 of the embodiment as in the first embodiment, the timing pulse generator 2 applies a substrate voltage at the starting point of time of one frame period, and residual charges in all the photodiodes 8 (all the pixels) are reset. Charge is accumulated in photodiodes 8 during a prescribed long-time exposure period.

The timing pulse generator 2 applies a gate voltage to the first gate electrode 13 and the third gate electrode 18 at the first read timing after the long-time exposure period, and the accumulated charges in photodiodes 8 for use in long-time exposure and for use in short-time exposure are read.

The timing pulse generator 2 then applies the substrate voltage again in the one frame period, and residual charges in all the photodiodes 8 (all the pixels) are reset. Charge is accumulated in photodiodes 8 during a prescribed short-time exposure period.

The timing pulse generator 2 applies a gate voltage to the second gate electrode 14 at the second read timing after the short-time exposure period, and the accumulated charge in photodiodes 8 for use in short-time exposure is read. In the embodiment, the accumulated charge in photodiodes 8 for use in long-time exposure is not read at the second read timing.

Figure 11:
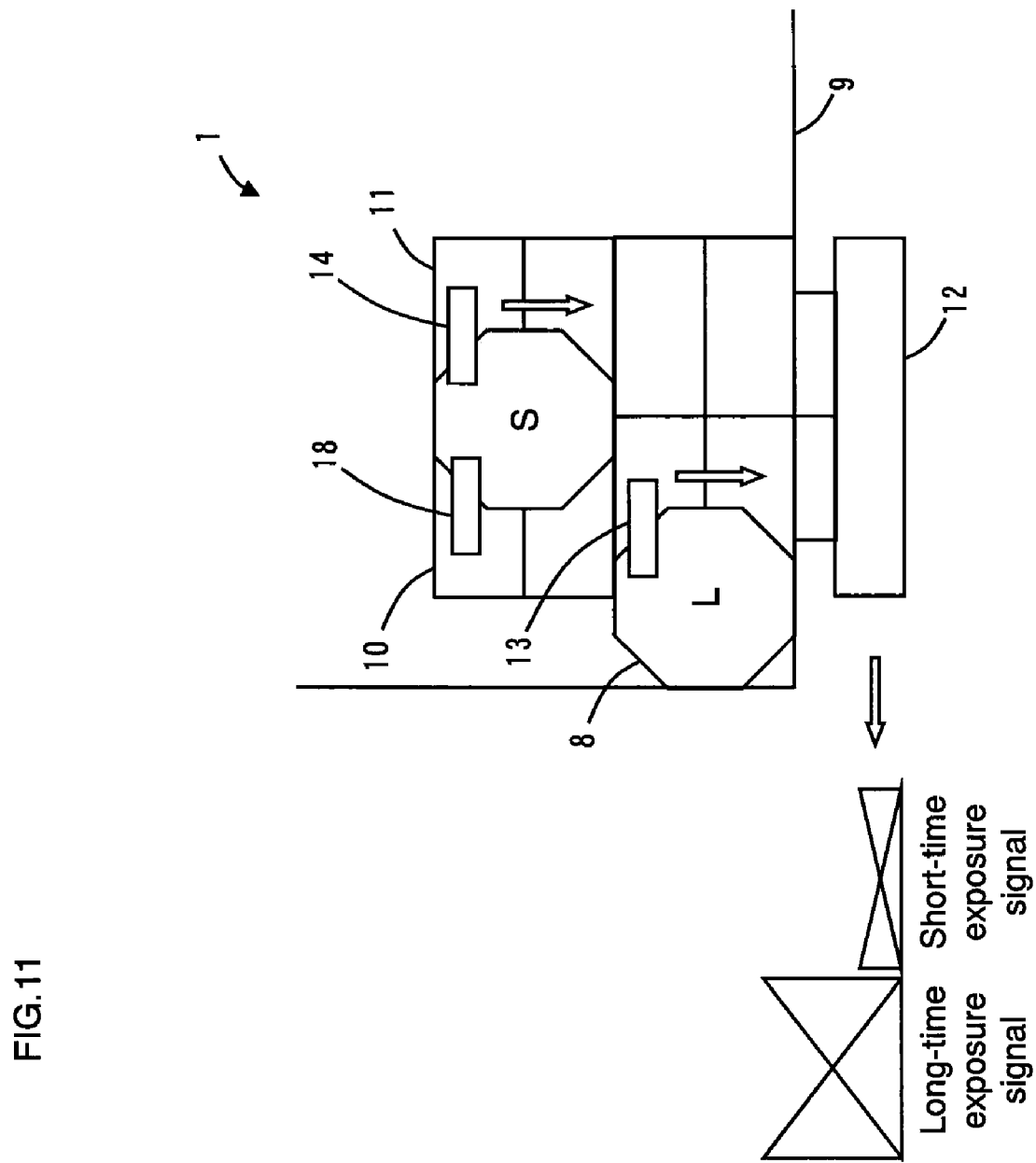
FIG. 11 is an illustration of an operation of the imaging element of the imaging device of the second embodiment of the invention.

FIG. 11 shows how accumulated charges are read from photodiodes 8 and the imaging element 1 outputs long-time and short-time exposure signals. The accumulated charge read from photodiodes 8 for use in long-time exposure at the first read timing as described above is read through the first gate electrode 13 to the first vertical transfer path 10 and is held on the first vertical transfer path 10. In the embodiment, the accumulated charge read from photodiodes 8 for use in short-time exposure at the first read timing is also read through the third gate electrode 18 to the first vertical transfer path 10 and is held on the first vertical transfer path 10. On the first vertical transfer path 10, the accumulated charge of long-time exposure read from photodiodes 8 for use in short-time exposure is added to the accumulated charge of long-time exposure read from photodiodes 8 for use in long-time exposure. The accumulated charge read from photodiodes 8 for use in short-time exposure at the second read timing is read through the second gate electrode 14 to the second vertical transfer path 11 and is held on the second vertical transfer path 11.

The accumulated charges separately held on the first and second vertical transfer paths 10 and 11 are transferred one by one in the vertical direction (downward in FIG. 11) and are read to the horizontal transfer path 12. The accumulated charges read to the horizontal transfer path 12 are transferred one by one in the horizontal direction (leftward in FIG. 11) and are outputted as long-time and short-time exposure signals.

In this way, the long-time exposure signal generator 15 generates a long-time exposure signal, adding an accumulated charge of long-time exposure from photodiodes 8 for use in short-time exposure to an accumulated charge of long-time exposure from photodiodes 8 for use in long-time exposure. The short-time exposure signal generator 16 generates a short-time exposure signal, using an accumulated charge of short-time exposure from photodiodes 8 for use in short-time exposure. The generated long-time and short-time exposure signals are outputted as an output signal from the imaging element 1.

Such an imaging device of the second embodiment of the invention can provide the same effects as the first embodiment.

Moreover, in the embodiment, the accumulated charge of long-time exposure read from photodiodes 8 for use in short-time exposure can be used as well as the accumulated charge of long-time exposure read from photodiodes 8 for use in long-time exposure, and the sensitivity to the long-time exposure signal is improved to double.

In the embodiment, when a gate voltage is applied to the third gate electrode 18 at the first read timing, an accumulated charge of long-time exposure is read from photodiodes 8 for use in short-time exposure to the first vertical transfer path 10. Consequently, an accumulated charge of long-time exposure read from photodiodes 8 for use in short-time exposure can be used.

Third Embodiment

An imaging device of a third embodiment of the invention will next be described with reference to FIG. 12. The configuration of the imaging device of the embodiment is the same as the second embodiment. In this description, therefore, the operation of the imaging device of the embodiment will be described with reference to FIG. 12.

Figure 12:
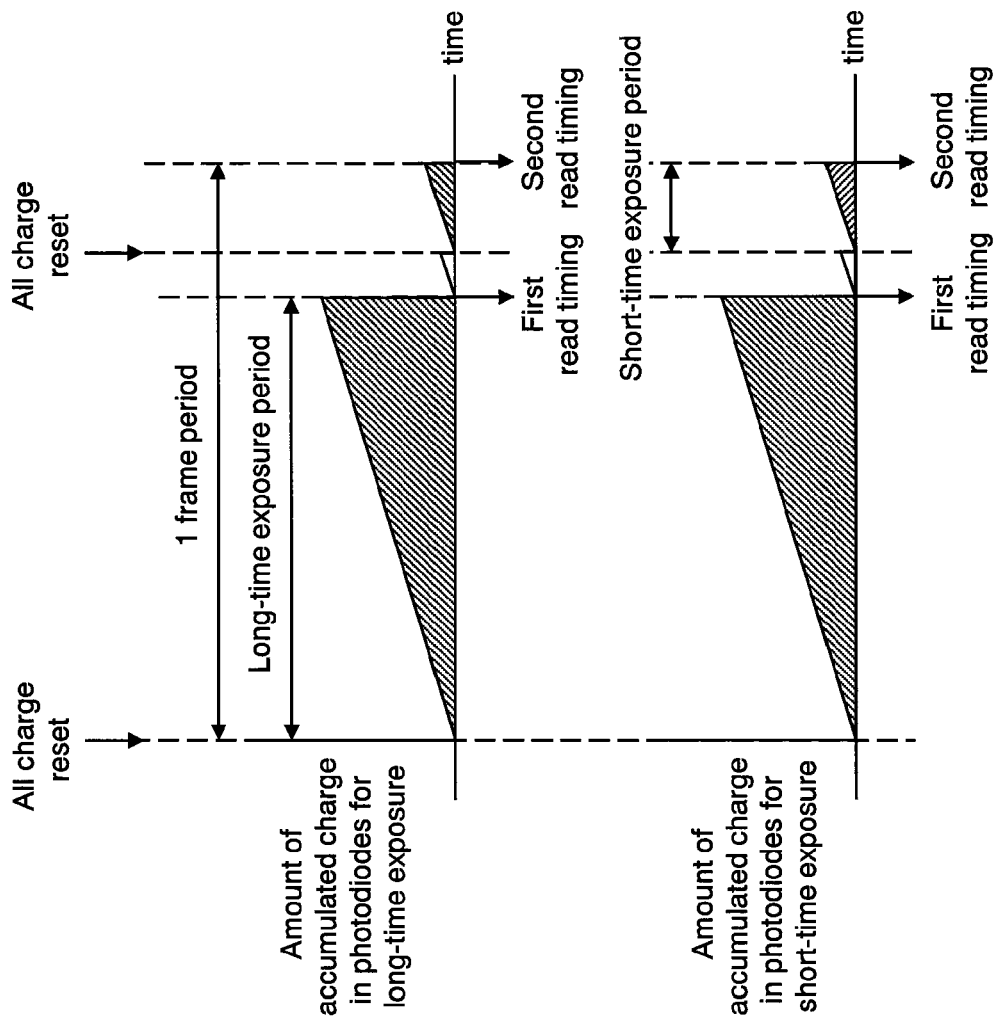
FIG. 12 is an illustration of operation timings of an imaging device of a third embodiment of the invention.

FIG. 12 shows how the amount of accumulated charge in photodiodes 8 changes according to time. As shown in FIG. 12, in the imaging element 1 of the embodiment as in the second embodiment, the timing pulse generator 2 applies a substrate voltage at the starting point of time of one frame period, and residual charges in all the photodiodes 8 (all the pixels) are reset. Charge is accumulated in photodiodes 8 during a prescribed long-time exposure period.

The timing pulse generator 2 applies a gate voltage to the first gate electrode 13 and the third gate electrode 18 at the first read timing after the long-time exposure period, and the accumulated charges in photodiodes 8 for use in long-time exposure and for use in short-time exposure are read.

The timing pulse generator 2 then applies the substrate voltage again in the one frame period, and residual charges in all the photodiodes 8 (all the pixels) are reset. Charge is accumulated in photodiodes 8 during a prescribed short-time exposure period.

The timing pulse generator 2 applies a gate voltage to the second gate electrode 14 at the second read timing after the short-time exposure period, and the accumulated charge in photodiodes 8 for use in short-time exposure is read. In the embodiment, the timing pulse generator 2 applies a gate voltage to the first gate electrode 13 at the second read timing, and the accumulated charge in photodiodes 8 for use in long-time exposure is read. In this embodiment, the first gate electrode 13 and the first vertical transfer path 10 correspond to the fourth reader of the invention.

The accumulated charge read from photodiodes 8 for use in long-time exposure at the first read timing as described above is read through the first gate electrode 13 to the first vertical transfer path 10 and is held on the first vertical transfer path 10. In the embodiment as in the second embodiment, the accumulated charge read from photodiodes 8 for use in short-time exposure at the first read timing is also read through the third gate electrode 18 to the first vertical transfer path 10 and is held on the first vertical transfer path 10. On the first vertical transfer path 10, the accumulated charge of long-time exposure read from photodiodes 8 for use in short-time exposure is added to the accumulated charge of long-time exposure read from photodiodes 8 for use in long-time exposure.

The accumulated charge read from photodiodes 8 for use in short-time exposure at the second read timing is read through the second gate electrode 14 to the second vertical transfer path 11 and is held on the second vertical transfer path 11. In the embodiment, the accumulated charge read from photodiodes 8 for use in long-time exposure at the second read timing is read through the first gate electrode 13 to the first vertical transfer path 10 and is held on the first vertical transfer path 10. On the first vertical transfer path 10, the accumulated charge of short-time exposure read from photodiodes 8 for use in long-time exposure is further added to the accumulated charge of long-time exposure read from photodiodes 8 for use in long-time exposure and the accumulated charge of long-time exposure read from photodiodes 8 for use in short-time exposure.

The accumulated charges separately held on the first and second vertical transfer paths 10 and 11 are transferred one by one in the vertical direction and are read to the horizontal transfer path 12. The accumulated charges read to the horizontal transfer path 12 are transferred one by one in the horizontal direction and are outputted as long-time and short-time exposure signals.

In this way, the long-time exposure signal generator 15 generates a long-time exposure signal, adding an accumulated charge of long-time exposure from photodiodes 8 for use in short-time exposure to an accumulated charge of long-time exposure from photodiodes 8 for use in long-time exposure, and further adding thereto an accumulated charge of short-time exposure from photodiodes 8 for use in long-time exposure. The short-time exposure signal generator 16 generates a short-time exposure signal, using an accumulated charge of short-time exposure from photodiodes 8 for use in short-time exposure. The generated long-time and short-time exposure signals are outputted as an output signal from the imaging element 1.

Such an imaging device of the third embodiment of the invention can provide the same effects as the second embodiment.

Moreover, in the embodiment, the accumulated charge of short-time exposure read from photodiodes 8 for use in long-time exposure can be used as well as the accumulated charge of long-time exposure read from photodiodes 8 for use in long-time exposure and photodiodes 8 for use in short-time exposure, and the sensitivity to the long-time exposure signal is further improved.

In the embodiment, when a gate voltage is applied to the first gate electrode 13 at the second read timing, an accumulated charge of short-time exposure is read from photodiodes 8 for use in long-time exposure to the first vertical transfer path 10. Consequently, an accumulated charge of short-time exposure read from photodiodes 8 for use in long-time exposure can be used.

While there have been described embodiments of the invention with reference to illustrations, the scope of the invention is not limited thereto, and modifications and variations may be made thereto within the claimed scope according to purposes.

Figure 13:
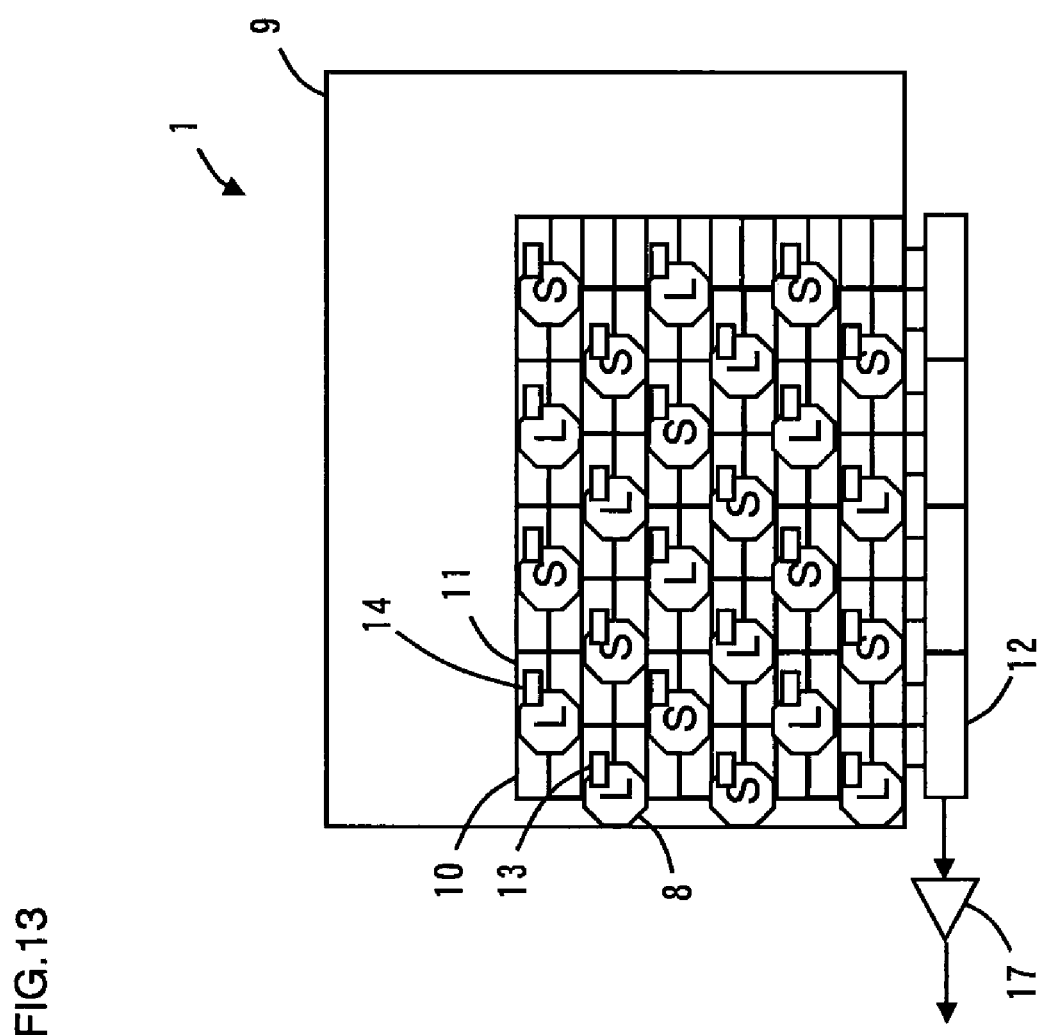
FIG. 13 is an illustration of a pixel arrangement of an imaging element of an imaging device of another embodiment.

For example, in the above description, there has been described an example in which photodiodes 8 for use in long-time exposure and photodiodes 8 for use in short-time exposure are alternately arranged line by line and row by row (see FIG. 3). That is, there has been described an example in which each line of photodiodes 8 comprises the same photodiodes 8 for use in long-time exposure (or photodiodes 8 for use in short-time exposure), or in which each row of photodiodes 8 comprises the same photodiodes 8 for use in long-time exposure (or photodiodes 8 for use in short-time exposure). However, the scope of the invention is not limited thereto and, as shown in FIG. 13, photodiodes 8 for use in long-time exposure and photodiodes 8 for use in short-time exposure may be alternately arranged in each line or row of photodiodes 8.

In the above description, there has been described an example in which photodiodes 8 are arranged so that lines and rows of photodiodes 8 are shifted from each other, but the scope of the invention is not limited thereto. For example, as shown in FIGS. 14A to 14D, photodiodes 8 may be arranged so that lines and rows of photodiodes 8 are aligned.

Figure 14A:
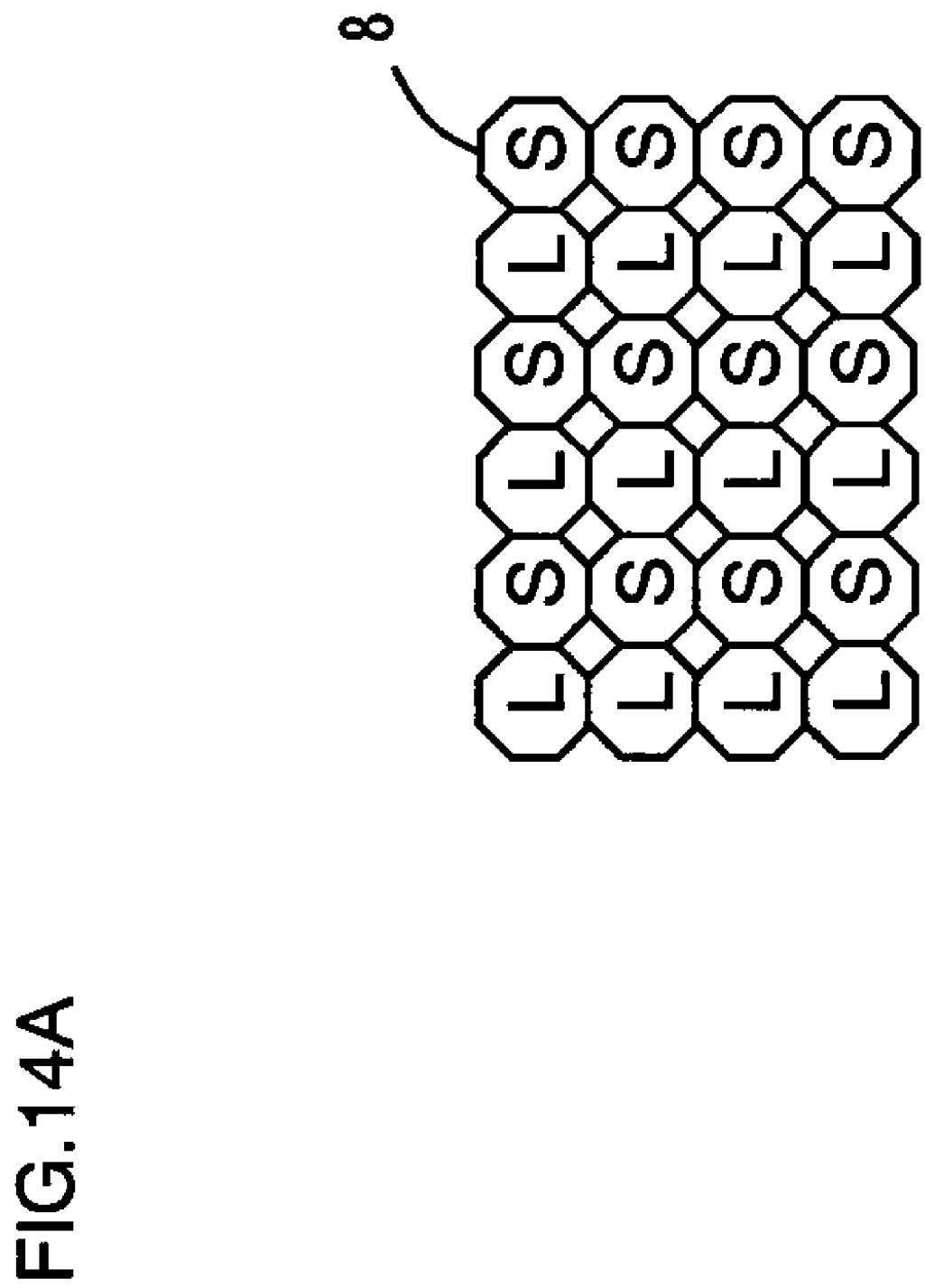
FIG. 14A is an illustration of a pixel arrangement for a case where pixels are alternately arranged row by row.
Figure 14B:
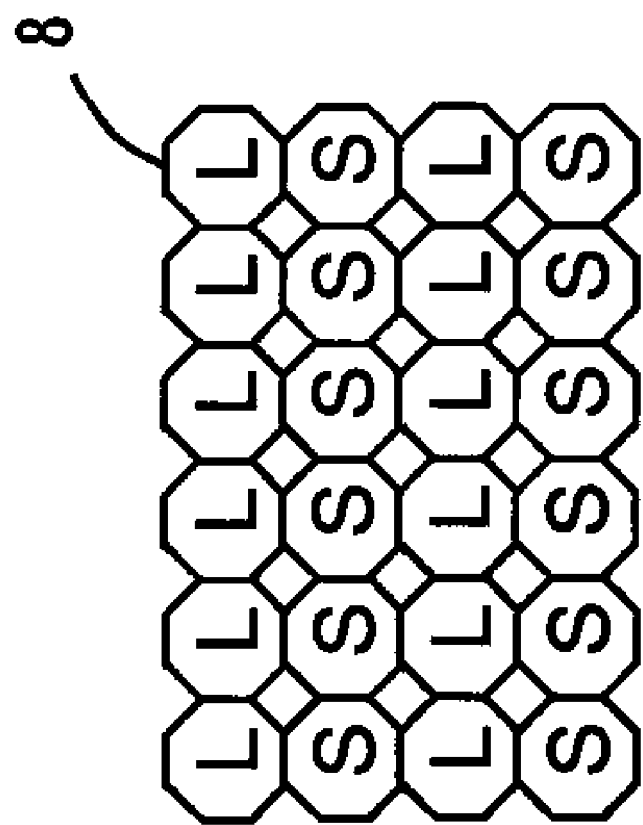
FIG. 14B is an illustration of a pixel arrangement for a case where pixels are alternately arranged line by line.

FIGS. 14A to 14D are illustrations of pixel arrangements of imaging elements of imaging devices of still other embodiments. As shown in FIG. 14A, photodiodes 8 for use in long-time exposure and photodiodes 8 for use in short-time exposure may be alternately arranged every rows (row by row, for example). As shown in FIG. 14B, photodiodes 8 for use in long-time exposure and photodiodes 8 for use in short-time exposure may be alternately arranged every lines (line by line, for example).

Figure 14C:
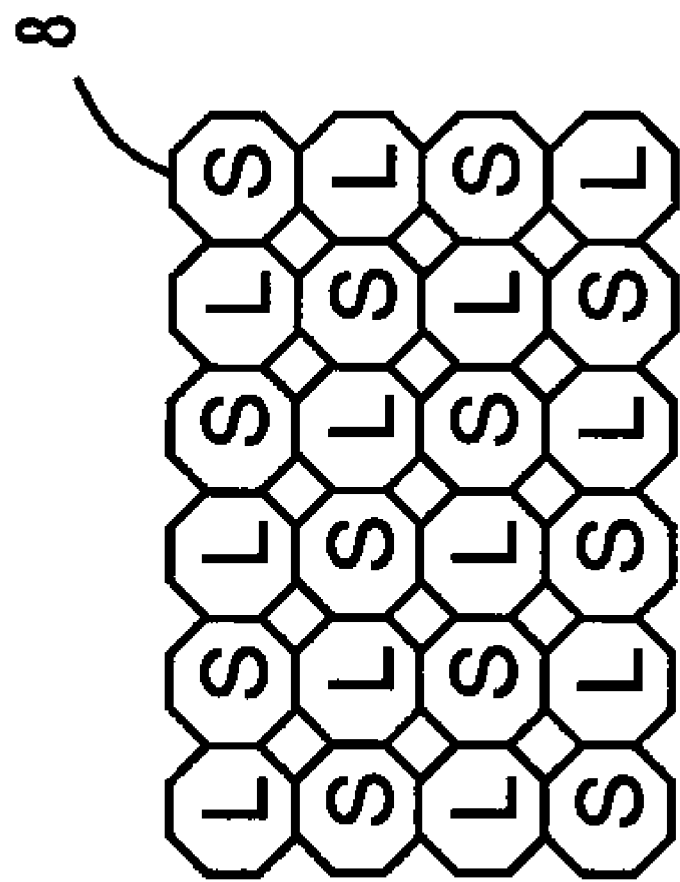
FIG. 14C is an illustration of a pixel arrangement for a case where pixels are alternately arranged one by one.
Figure 14D:
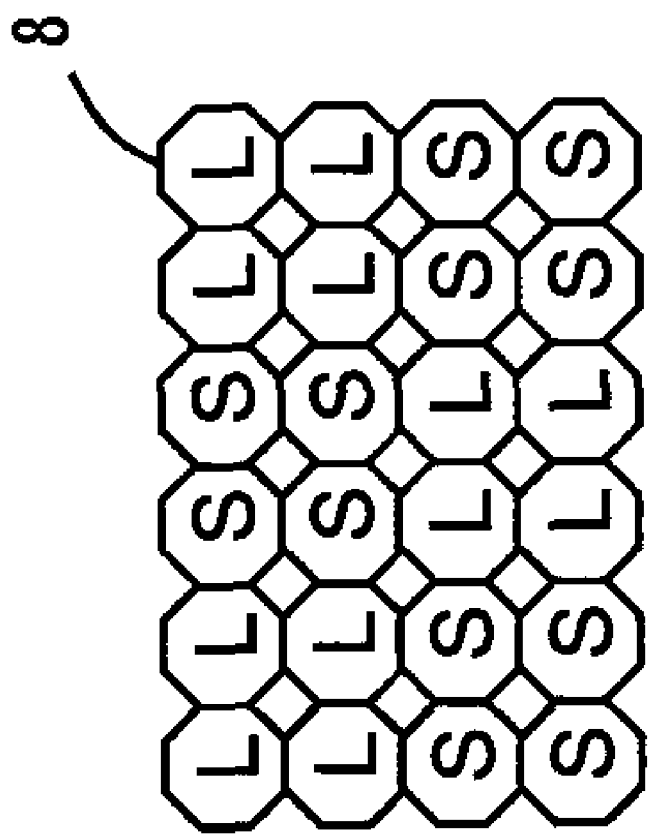
FIG. 14D is an illustration of a pixel arrangement for a case where pixels are alternately arranged two by two.

Moreover, as shown in FIG. 14C, photodiodes 8 for use in long-time exposure and photodiodes 8 for use in short-time exposure may be alternately arranged one by one in longitudinal and transverse directions so that they form a checkerboard pattern. As shown in FIG. 14D, photodiodes 8 for use in long-time exposure and photodiodes 8 for use in short-time exposure may be alternately arranged block by block in longitudinal and transverse directions so that they form a checkerboard pattern in two-lines-by-two-rows blocks.

While there have been described what are at present considered to be preferred embodiments of the invention, it will be understood that various modifications and variations may be made thereto, and it is intended that appended claims cover all such modifications and variations as fall within the true spirit and scope of the invention.

INDUSTRIAL APPLICABILITY

As above, the imaging device of the invention has advantages of being able to adjust an exposure time for each pixel group and to extend the dynamic range according to the degree of contrast between light and shade of a subject, and is useful as an imaging device or the like to be used for a surveillance camera or the like.

The invention claimed is:
1. An imaging device comprising:
an imaging unit capable of reading accumulated charge signals of different exposure times, in a predetermined frame period, from a plurality of photodiodes which are divided into a long-time exposure photodiode group and a short-time exposure photodiode group;
a first reader for reading an accumulated charge signal of long-time exposure from said long-time exposure photodiode group at a first read timing after a long-time exposure period in said frame period;
a second reader for reading an accumulated charge signal of short-time exposure from said short-time exposure photodiode group at a second read timing after a short-time exposure period in said frame period;
a read timing adjuster for adjusting said first read timing and said second read timing separately from each other;
a long-time exposure signal generator for generating a long-time exposure signal, using said accumulated charge signal of long-time exposure read from said long-time exposure photodiode group;
a short-time exposure signal generator for generating a short-time exposure signal, using said accumulated charge signal of short-time exposure read from said short-time exposure photodiode group;
a synthesizer for synthesizing said long-time exposure signal and said short-time exposure signal to generate an image signal representing the plurality of photodiodes; and
a third reader for reading an accumulated charge signal of long-time exposure from said short-time exposure photodiode group at said first read timing in said frame period,
wherein said long-time exposure signal generator adds said accumulated charge signal of long-time exposure read from said short-time exposure photodiode group to said accumulated charge signal of long-time exposure read from said long-time exposure photodiode group to generate said long-time exposure signal.

2. The imaging device according to claim 1, comprising
a fourth reader for reading an accumulated charge signal of short-time exposure from said long-time exposure photodiode group at said second read timing in said frame period,
wherein said long-time exposure signal generator adds said accumulated charge signal of short-time exposure read from said long-time exposure photodiode group to said accumulated charge signal of long-time exposure read from said long-time exposure photodiode group to generate said long-time exposure signal.

3. The imaging device according to claim 2,
wherein said fourth reader comprises: a first transfer path that connects with each photodiode in said long-time exposure photodiode group; and a first gate electrode to be a read path from each photodiode in said long-time exposure photodiode group to said first transfer path, and
wherein said read timing adjuster applies a gate voltage to said first gate electrode at said second read timing.

4. The imaging device according to claim 1,
wherein said first reader comprises: a first transfer path that connects with each photodiode in said long-time exposure photodiode group; and a first gate electrode which is to be a read path from each photodiode in said long-time exposure photodiode group to said first transfer path,
wherein said second reader comprises: a second transfer path that connects with each photodiode in said short-time exposure photodiode group; and a second gate electrode which is to be a read path from each photodiode in said short-time exposure photodiode group to said second transfer path, and
wherein said read timing adjuster applies a gate voltage to said first gate electrode at said first read timing and applies a gate voltage to said second gate electrode at said second read timing.

5. The imaging device according to claim 1,
wherein said third reader comprises: a first transfer path that connects with each photodiode in said short-time exposure photodiode group: and a gate electrode which is to be a read path from each pixel photodiode in said short-time exposure photodiode group to said first transfer path, and
wherein said read timing adjuster applies a gate voltage to said gate electrode at said first read timing.

6. The imaging device according to claim 1, wherein the long-time exposure photodiode group and the short-time exposure photodiode group are disjoint.

7. The imaging device according to any one of claims 1, 2, 4, 5, 3,
wherein photodiodes in said long-time exposure photodiode group and photodiodes in said short-time exposure photodiode group are alternately arranged in a longitudinal or transverse direction.

8. The imaging device according to any one of claims 1, 2, 4, 5, 3, wherein said photodiodes are arranged so that a photodiode array thereof is a Bayer array in each of said long-term exposure photodiode group and said short-time exposure photodiode group.

9. An imaging method wherein an imaging unit capable of reading accumulated charge signals of different exposure times, within a predetermined frame period, from a plurality of photodiodes, which are divided into a long-time exposure photodiode group and a short-time exposure pixel photodiode group, is used, said method comprising:

adjusting a first read timing after a long-time exposure period in said frame period and a second read timing after a short-time exposure period in said frame period separately from each other;
reading an accumulated charge signal of long-time exposure from said long-time exposure photodiode group and said short-time exposure photodiode group respectively at said first read timing;
reading an accumulated charge signal of short-time exposure from said short-time exposure photodiode group at said second read timing;
generating a long-time exposure signal, by adding said accumulated charge signal of long-time exposure read from said long-time exposure photodiode group and said short-time exposure photodiode group at the first read timing;
generating a short-time exposure signal, using said accumulated charge signal of short-time exposure read from said short-time exposure photodiode group at the second read timing; and
synthesizing said long-time exposure signal and said short-time exposure signal to generate an image signal representing the plurality of photodiodes.

10. The imaging method of claim 9, wherein the long-time exposure photodiode group and the short-time exposure photodiode group are disjoint.

11. A non-transitory computer readable medium containing an imaging program for imaging,
wherein an imaging unit capable of reading accumulated charge signals of different exposure times, within a predetermined frame period from a plurality of photodiodes, which are divided into a long-time exposure photodiode group and a short-time exposure photodiode group, is used, and
wherein said imaging unit is capable of adjusting a first read timing after a long-time exposure period in said frame period and a second read timing after a short-time exposure period in said frame period separately from each other, and
said program causes a computer to execute procedures of:
reading an accumulated charge signal of long-time exposure from said long-time exposure photodiode group and said short-time exposure photodiode group respectively at said first read timing;
reading an accumulated charge signal of short-time exposure from said short-time exposure photodiode group at said second read timing;
generating a long-time exposure signal, by adding said accumulated charge signal of long-time exposure read from said long-time exposure photodiode group and said short-time exposure photodiode group at the first read timing;
generating a short-time exposure signal, using said accumulated charge signal of short-time exposure read from said short-time exposure photodiode group at the second read timing; and
synthesizing said long-time exposure signal and said short-time exposure signal to generate an image signal representing the plurality of photodiodes.

12. The non-transitory computer readable medium of claim 11 containing the imaging program for imaging, wherein the long-time exposure photodiode group and the short-time exposure photodiode group of the imaging unit are disjoint.

* * * * *